United States Patent [19]

Millington et al.

[11] 4,286,069
[45] Aug. 25, 1981

[54] METHOD OF MAKING EXPANDABLE STYRENE-TYPE BEADS

[75] Inventors: James E. Millington, Lunenberg; Stelvio Papetti, Leominster, both of Mass.

[73] Assignee: American Hoechst Corporation, Somerville, N.J.

[21] Appl. No.: 201,659

[22] Filed: Oct. 28, 1980

[51] Int. Cl.³ .................................................. C08J 9/16
[52] U.S. Cl. ........................................ 521/56; 521/57; 521/60
[58] Field of Search .................... 521/56, 60, 57, 59

[56] References Cited

U.S. PATENT DOCUMENTS

| | | | |
|---|---|---|---|
| 3,468,820 | 9/1969 | Buchholtz et al. | 521/56 |
| 3,480,570 | 11/1969 | Roberts et al. | 521/57 |
| 3,991,020 | 11/1976 | Alvares et al. | 521/57 |
| 4,042,541 | 8/1977 | Watts | 521/56 |
| 4,153,763 | 5/1979 | Bracke | 521/60 |
| 4,174,427 | 11/1979 | Davis | 521/56 |

FOREIGN PATENT DOCUMENTS 1174749  12/1969  United Kingdom ............ 521/56

Primary Examiner—Morton Foelak
Attorney, Agent, or Firm—Tatsuya Ikeda

[57] ABSTRACT

Expandable styrene-type polymer beads having a short cooling time are made by impregnating the polymer beads, after the substantial completion of the polymerization, in an aqueous suspension medium comprising a suspending agent and about 0.005–0.3%, based on the weight of water, of non-ionic surfactant which is a copolymer of propylene oxide and ethylene oxide having an HLB number of 8–18 and an average molecuar weight of at least 1,000, and by subsequently washing and drying the beads.

5 Claims, 2 Drawing Figures

METHOD OF MAKING EXPANDABLE STYRENE-TYPE BEADS

BACKGROUND OF THE INVENTION

This invention relates to a method for making expandable styrene-type polymers having a short cooling time.

The making of expandable particles of styrene-type polymers is well known. It comprises two basic aspects, polymerization of styrene-type monomer and the impregnation of the polymer with a blowing agent. The polymerization reaction is usually conducted either in bulk or in suspension. Where the bulk polymerization method is used to prepare the polymer the impregnation step is usually conducted in a separate reactor. In the case of the suspension polymerization method the impregnation may be carried out either as a step contiguous to the polymerization by introducing the blowing agent to the reactor at a certain point in the conversion of monomer to polymer or at the completion of the polymerization, or as a step completely separate and independent of the polymerization. In the latter case, the bead product of the suspension polymerization is taken from the reactor, washed, and subsequently, the impregnation step is conducted by re-suspending the polymer in water. The latter method has the advantage that out of the total polymer beads obtained by suspension polymerization, one can select only those beads having a particle size suitable for expandable styrene-type polymer usage and use the rest for other purposes.

The impregnated particles are usually pre-expanded and aged before introduction into the mold to stabilize the bead structure and control the final density of the mold article. The molding step is conducted by filling the mold cavity with the pre-expanded polymer particles and heating them above the softening point usually by use of superheated steam. The minimum time period, after the introduction of steam into the mold, that the article must remain in the mold before removal is generally called the "cooling time". The cooling time is a very substantial portion of the molding cycle and hence the reduction thereof has an important commercial significance for enhancing production efficiency. Many attempts have been made in the past to reduce the cooling time for these products, for instance:

U.S. Pat. No. 3,468,820 (1969) discloses a method of suspension-polymerizing styrene in the presence of a blowing agent and 0.001 to 1% of a water-insoluble high molecular weight polymer of a vinyl ester, vinyl ether, acrylic ester, or methacrylic ester which will dissolve in the monomer but is not homogeneously miscible with the polymer obtained. The patent discloses that the resultant polymer has fine and uniform cells and also a relatively short cooling time.

U.S. Pat. No. 3,480,570 (1969) discloses a method of coating expandable polystyrene beads with 0.02–0.3% by weight of sorbitan fatty acid ester containing 12–18 carbon atoms in the fatty acid moiety and having an HLB (hydrophilic-lipophilic balance) number of 1.5–9. The patent discloses that the cooling time is reduced typically to 50–80% of the "normal" value.

British Pat. No. 1,174,749 (1969) discloses an aqueous suspension polymerization method for preparing expandable polystyrene beads having a reduced cooling time which method comprises impregnating the polymer beads with a blowing agent in the presence of a polyoxyethylene compound after the beads have reached the bead identity point. The polyoxyethylene compound may be a polyoxyethylene monoester of a fatty acid, a polyoxyethylene sorbitan monoester of a fatty acid or a polyoxyethylene monoether of a fatty alcohol, having an HLB number of at least 15.

U.S. Pat. No. 3,991,020 (1969) discloses an expandable polystyrene composition wherein 0.005–1.0% (based on the weight of polystyrene) of a polyether derived from propylene oxide or from propylene oxide and ethylene oxide is homogeneously dispersed on at least the surface of the expandable particles. The admixture of polyethers and polystyrene is prepared by mixing the expandable polystyrene particles with the additive, or a portion of the additive may be incorporated in the polystyrene during polymerization and the remaining portion added to the subsequent mixture. This patent also discloses a process for preparing expandable polystyrene wherein the monomer is polymerized in aqueous suspension, a blowing agent is admixed with the polymer formed during and/or at the end of the polymerization, and the polymer containing the expanding agent is separated from the suspension medium and subsequently mixed with 0.005–1.0% by weight of polyethers derived from propylene oxide or from propylene and ethylene oxides. The main advantages disclosed in this patent are that the expandable beads have an anti-lumping property during the pre-expansion and a short cooling time.

U.S. Pat. No. 4,042,541 (1977) discloses expandable polystyrene beads having a reduced cooling time containing, uniformly dispersed within the beads, from about 100 to 300 ppm of stearic acid and from about 40 to 120 ppm of calcium stearate.

U.S. Pat. No. 4,174,427 (1979) discloses a method for making expandable polystyrene beads suitable for making drinking cups and other impervious containers wherein the polymerization of styrene is conducted in the presence of polyvinyl pyrrolidone, and, after impregnation, the beads are washed in an aqueous solution of a hydrophilic alkoxylated nonionic surfactant, which is solid at room temperature and has 70–90 weight percent of the polymer chain accounted for by oxyethylene units, for about 3 to 10 hours at a temperature of 40°–55° C. to remove contaminated grafted polyvinyl pyrrolidone from the surface of said beads. The primary purpose of this patented process is to obtain polystyrene beads which are expandable into impervious containers and which are free from mold-filling and static-electricity problems.

We have developed a method for making styrene-type expandable polymer beads having a short cooling time wherein the impregnation is carried out in an aqueous suspending medium comprising about 0.005–0.3%, based on the weight of water, of a nonionic surfactant which is a copolymer of propylene oxide and ethylene oxide having an HLB number of 8–18 and an average molecular weight of at least 1,000, and the resultant expandable beads are subsequently washed with water and dried. We have discovered that the use of the particular type of propylene oxide-ethylene oxide copolymer as a surfactant in the impregnation step affords polymer beads the cells of which after pre-expansion are non-uniform; namely, the beads have smaller cells toward the outer peripheral portion and larger cells toward the core. The pre-expanded polymer beads having such "edge-zone" cell structure seem to be more advantageous than those having uniform cell size distribution for the purpose of reducing the cooling time of the final molding process.

SUMMARY OF THE INVENTION

The present invention is a method of making expandable styrene-type polymers having a short cooling time which comprises impregnating the polymer beads in an aqueous suspension system comprising a suspending agent and about 0.005% to 0.3%, based on the weight of water, of nonionic surfactant which is a copolymer of propylene oxide and ethylene oxide having an HLB number of 8–18 and an average molecular weight of at least 1,000 and thereafter washing the beads with water and drying the same.

DETAILED DESCRIPTION OF THE INVENTION

Figure 1:
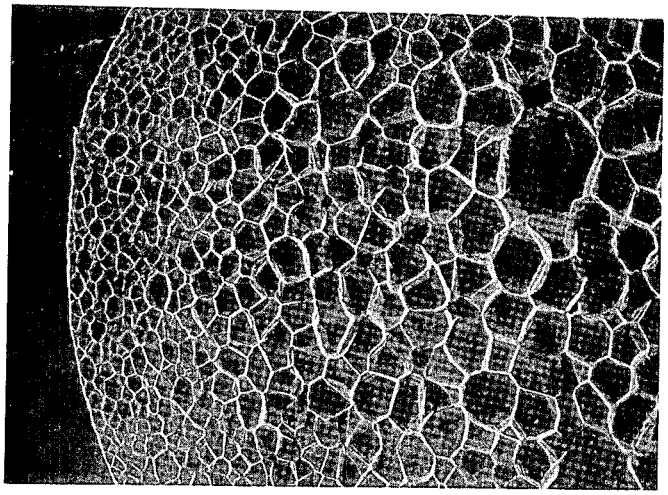
FIG. 1 is an electron microscope picture at X50 magnification of the cell structure, in a pre-expanded stage, of a typical expandable polystyrene bead prepared in accordance with the method of this invention showing an "edge-zone" structure.

"Styrene-type" compound as used herein means a vinyl aromatic compound with or without a substituent or substituents on the aromatic nucleus or on the vinyl group. Thus, styrene-type compound includes such compounds as styrene, α-methyl styrene, o, m and p-methyl styrene, o, m and p-ethyl styrene and o, m and p-isopropyl styrene. "Styrene-type polymer" as used herein means a polymer which is essentially a homopolymer of a styrene-type compound, a copolymer obtained from a mixture of styrene-type compounds, a copolymer comprising in chemically combined form at least 50% and preferably at least 70% by weight of one of the styrene-type compounds, or a mixture of such homopolymer(s) and copolymer(s). Thus, a certain amount of non-styrene-type monomer(s) may be used in obtaining said styrene-type polymers, and also additives may be present in said styrene-type polymers.

The styrene-type polymer to be used in the impregnation method of this invention may be obtained in any suitable polymerization method. Where a styrene-type polymer is obtained by bulk polymerization, the polymer must be formed into a desired shape and size before impregnation, and the impregnation is conducted as a separate step following polymerization. A typical method employed for this purpose is to extrude the polymer through a die having circular holes, cool the resultant strands, and then cut the strands to the desired length. Where the product of suspension polymerization is employed in the method of this invention, the impregnation process may be conducted either within the same reactor used for suspension polymerization by introducing a blowing agent into the reactor after the substantial completion of polymerization, or it may be conducted as a separate step. The latter method, however, has the advantage that one can select for impregnation purpose only those beads which fall within a desired size range. The method of this invention is not limited by any specific size or shape of the styrene-type polymer "beads". The term "bead" as used herein should be construed very broadly as to size and shape. Thus, "beads" shall include, for instance, spherical beads and cylindrical beads. Spherical beads, however, are usually preferred over cylindrical beads. Thus, for the purpose of this invention it is usually preferable to use the product of suspension polymerization rather than that of bulk polymerization, and it is also preferable to conduct the impregnation as a step separate from and independent of the suspension polymerization. The preferred range of the bead size before pre-expansion depends upon the specific application but typically it is 0.35–1.4 mm in diameter (or the representative length). The phrase "substantial completion of polymerization" as used herein shall mean that the solids content of the polymer beads has reached about 90%.

Various suspending agents may be used for the impregnation step of this invention. An essential requirement of this invention, however, is that a nonionic surfactant which is copolymer of propylene oxide and ethylene oxide having an HLB number of 8–18 and an average molecular weight of at least 1,000 be present in the amount of 0.005–0.3% of the weight of the water medium. The presence of said nonionic surfactant in the suspension medium during the impregnation process affords expandable polymer beads having an edge-zone cell structure and a short cooling time. Below 0.005% the advantageous effect of the nonionic surfactant mentioned above is small, and above 0.3% the countervailing effect of shrinkage of the molded article becomes more manifest. A preferred suspending agent is a combination of tricalcium phosphate and ammonium lauroyl sulfate. The preferred amounts of these components in the aqueous suspension medium are; tricalcium phosphate 0.3–1.0%, and ammonium lauroyl sulfate 0.001–0.01%, based on the weight of water medium.

Various blowing agents may be used in this invention. Preferred blowing agents include n-pentane, iso-pentane and mixtures thereof. Suitable process conditions for the impregnation of polystyrene beads including temperature, time and the amount of blowing agent with respect to the amount of polymer beads are well known in the art. Where styrene homopolymer beads of size range 0.35–1.4 mm are impregnated with n/isopentane mixture, the preferred condition is typically the following: temperature 90°–120° C., time 2–6 hours, weight of pentane mixture absorbed 1–10% of the weight of the polymer beads.

The nonionic surfactant to be used in this invention is copolymer of propylene oxide and ethylene oxide having an HLB number of 8–18 and an average molecular weight of at least 1,000. A more preferred range of HLB number is 10–17, and the most preferred range is 12–16. A minor amount of a third chemical component may be present within or at the end of the copolymer chain. The copolymer may or may not have some regularity as to the monomer sequence. Thus, for example, the copolymer may be a block copolymer. Usually, of course, the surfactant has some spread (distribution) as to the molecular weight and the chemical composition of the copolymer chain. Where a mixture of random and block copolymers is used, there is, of course, a spread as to the monomer sequence as well. It is possible to prepare a block copolymer of propylene oxide and ethylene oxide having a narrow molecular weight distribution, for instance, by a controlled addition of propylene oxide to a propylene glycol substrate followed by a subsequent controlled addition of ethylene oxide. This type of copolymer is commercially available as ®PLURONIC POLYOLS from BASF Wyandotte Corporation, Wyandotte, Mich.

The definition and the determination of the HLB number of a copolymer or a mixture thereof used in this invention are reported in "HLB System" published in 1976 by ICI United States Incorporated, Wilmington, Del. The HLB number is the weight percentage of the hydrophilic portion of the nonionic surfactant molecule divided by five (5). The experimental method of HLB determination consists of blending the unknown surfactant in varying ratios with a surfactant of known HLB number and using the blend to emulsify an oil of known "required HLB". The blend which performs best is assumed to have an HLB value approximately equal to the required HLB of the oil, so that the HLB value of the unknown can be calculated. Here, the assumption is made that the HLB number of a multi-component system is the weighted average of the HLB numbers of the components. In practice, a large number of experimental emulsions must be made, from which an average HLB value for the unknown is finally calculated.

The average molecular weight of the nonionic surfactant used in this invention must be above 1,000. A preferred range of the average molecular weight is about 1,500–6,000. The more preferred range is about 1,700–4,500.

Figure 2:
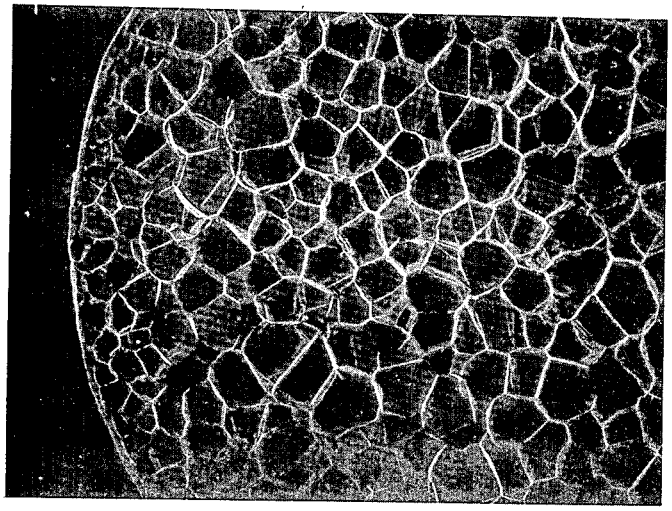
FIG. 2 is an electron microscope picture at X50 magnification of the cell structure, in a pre-expanded stage, of a typical expandable polystyrene bead prepared by a conventional method showing a fairly uniform cell size distribution.

After the impregnation is completed, the polymer beads are collected and washed thoroughly with water to remove residual substances from their surface including the nonionic surfactant. Where tricalcium phosphate is used as a suspending agent, usually the collected beads are first washed in acidic water to dissolve tricalcium phosphate and then the beads are washed thoroughly with neutral water. Alternately, the entire suspending medium may be acidified before collecting the beads. It is to be noted that the surfactant used in this invention is water soluble and hence is removed from the bead surface during the washing step. Thus, the advantageous effect of the surfactant is created during the impregnation step, not after the impregnation step. The cell structure of the bead which develops during the pre-expansion is determined by what happens in the impregnation step. Where the nonionic surfactant specified above is used in the impregnation step, the cell structure of the pre-expanded bead possesses and edge-zone structure (hereinafter described) whereas in the absence of said nonionic surfactant during impregnation the cell structure does not possess edge-zone structure. This difference is believed to be the cause of the shortened cooling time of this invention. FIG. 1 is an electron microscope picture at X50 magnification of a cross-section of a pre-expanded bead prepared according to the method of this invention where the impregnation was carried out using a suspension medium comprising tricalcium phosphate, ammonium lauroyl sulfate and a nonionic surfactant specified in this invention. It shows an edge-zone structure, namely, the cell size is smaller toward the outer perimeter of the sphere. FIG. 2 is an electron microscope picture at X50 magnification of a cross-section of a pre-expanded bead prepared according to a conventional impregnation method where the suspension medium comprised tricalcium phosphate and ammonium lauroyl sulfate, but no nonionic surfactant.

Pre-expansion is conducted usually about one (1) day before the molding. The temperature of the pre-expansion process is typically 90°–100° C. The length of time allowed for pre-expansion is determined by, inter alia, the target value of the bulk density of the pre-expanded beads. Typically a suitable bulk density of the pre-expanded beads is in the range of 0.8–2.5 lb/ft$^3$.

The art of the molding of the pre-expanded bead is well known. The optimum steam pressure varies somewhat with each sample, but it is typically in the range of 1.7–2.2 atm. Insufficient or low steam pressure tends to cause poor fusion of the beads and too high a pressure tends to cause shrinkage and burning (partial melting). The mold cavity usually has a pressure transducer which monitors the pressure exerted on the cavity wall by the molded article during the mold cycle.

Styrene-type polymer bead may contain a flame-retardant. We have observed that the method of this invention is suitable for preparing self-extinguishing styrene-type polymers containing flame-retarding agent as well as unmodified styrene-type polymers. Examples of flame-retarding agents suitable for use in styrene-type polymers are well known. They include organic bromides containing at least four carbon atoms and a plurality of bromine atoms attached to the carbon atoms. Organic bromides having low volatility, little or no plasticizing effect on the styrene-type polymer, and no unpleasant odor are particularly suitable.

The styrene-type polymers may also contain other additives such as dyes, fillers and stabilizers.

The following examples are given for the purpose of illustrating the present invention.

EXAMPLE 1

Five clean ten-ounce beverage bottles are charged with 100 g of feedstock polystyrene beads having the size range of 16–30 mesh, 100 ml of distilled water, 1 g of tricalcium phosphate, 0.01 g of ammonium lauroyl sulfate, and 12 ml of mixed pentane. In bottle No. 1 no nonionic surfactant is added. In bottles No. 2, 3, 4 and 5, 0.10 g of ®Pluronic L-63, ®Pluronic L-44, 2:1 mixture of ®Pluronic L-44 and L-43, and 2:1 mixture of ®Pluronic L-44 and L-63 are added, respectively. The bottles are heated at 102° C. for 4 hours in an oil bath while being agitated by a tumbling action. After the completion of the impregnation, the beads are allowed to cool to below 40° C., decanted, washed with one-percent nitric acid, rinsed with distilled water, and dried in an air oven at about 30° C. for 1 hour. The beads contain approximately six-percent of mixed pentane based on the polymer weight.

The beads are pre-expanded using 2.5 psig steam for about 1.5 minutes to achieve a bulk density of 0.9 lb/ft$^3$. The pre-expanded beads are allowed to age overnight for drying and conditioning. The next day, the beads are molded in a laboratory one-liter mini-mold using 0.8 atm steam. The cooling time for each sample is measured as a time required for the pressure transducer reading to fall to 0.1 psig.

Table 1 summarizes the results of these experiments. The ®Pluronic surfactants mentioned above are block copolymers of propylene oxide and ethylene oxide where the oxypropylene block is in the middle of the chain and the oxyethylene block is connected to both ends of the oxypropylene block. The average molecular weights of ®Pluronic L-63, L-44 and L-43 are 2,650, 2,200, and 1,850, respectively.

TABLE I

Molding Of Unmodified Expandable Polystyrene Beads

| Run No. | Surfactant (0.1% of Water) | Ave. MW of Surfactant | HLB # | Cooling Time (min.) |
| --- | --- | --- | --- | --- |
| 1 | — | — | — | 9.5 |
| 2 | L-63 | 2650 | 11 | 5.2 |
| 3 | L-44 | 2200 | 16 | 4.5 |
| 4 | L-44 + L-43 (2:1) | 2080 | 14.7 | 3.9 |
| 5 | L-44 + L-63 (2:1) | 2350 | 14.3 | 4.2 |

EXAMPLE 2

Example 1 was repeated except that one percent, based on the weight of polymer beads, of a fire-retardant additive (bromine compound) was added to suspension in the impregnation system and the nonionic surfactant concentration in water was 0.025%. The results are summarized in Table 2.

TABLE 2

Molding of Modified Expandable Polystyrene Beads

| Run No. | Surfactant (0.025% of Water) | Cooling Time (min.) |
| --- | --- | --- |
| 1 | — | 9.9 |
| 2 | L-63 | 5.8 |
| 3 | L-44 | 5.3 |
| 4 | L-44 + L-43 (2:1) | 5.5 |
| 5 | L-44 + L-63 (2:1) | 5.4 |

We claim:

1. A method of making expandable styrene-type polymer beads wherein the polymer beads are impregnated after the substantial completion of the polymerization, in an aqueous suspension medium comprising a suspending agent and about 0.005-0.3%, based on the weight of water, of nonionic surfactant which is a copolymer of propylene oxide and ethylene oxide having an HLB number of 8-18 and an average molecular weight of at least 1,000, and then washed with water and dried.

2. A method of claim 1 wherein the suspending agent is tricalcium phosphate.

3. A method of claim 1 wherein the suspending agent is a combination of tricalcium phosphate and ammonium lauroyl sulfate.

4. A method according to any one of claim 1, 2 and 3, wherein the HLB number of the surfactant is 10-17.

5. A method according to any one of claim 1, 2 and 3, wherein the surfactant is a block copolymer of propylene oxide and ethylene oxide.

* * * * *